(12) United States Patent
Tasich et al.

(10) Patent No.: US 9,039,100 B2
(45) Date of Patent: May 26, 2015

(54) DUAL WHEEL AXLE ASSEMBLY

(75) Inventors: Daniel Tasich, Orchard Lake, MI (US);
Jonathon P. Verdun, Franklin, MI (US);
Mark S. Crowell, Canton, MI (US)

(73) Assignee: FCA US LLC, Auburn Hills, MI (US)

( * ) Notice: Subject to any disclaimer, the term of this patent is extended or adjusted under 35 U.S.C. 154(b) by 763 days.

(21) Appl. No.: 13/102,484

(22) Filed: May 6, 2011

(65) Prior Publication Data

US 2012/0280560 A1    Nov. 8, 2012

(51) Int. Cl.
*B60B 11/02*    (2006.01)

(52) U.S. Cl.
CPC ...................................... *B60B 11/02* (2013.01)

(58) Field of Classification Search
CPC ........ B60B 11/02; B60B 11/06; B60B 11/04; B60B 11/00
USPC .......................................................... 301/36.1
See application file for complete search history.

(56) References Cited

U.S. PATENT DOCUMENTS

| 4,017,756 A | 4/1977 | Davidson | |
|---|---|---|---|
| 2010/0001720 A1* | 1/2010 | Mizutani et al. | 324/207.25 |
| 2010/0038504 A1* | 2/2010 | Iemura | 248/220.21 |

* cited by examiner

*Primary Examiner* — Hezron E Williams
*Assistant Examiner* — Gregory J Redmann
(74) *Attorney, Agent, or Firm* — Ralph E Smith

(57) ABSTRACT

A dual wheel axle assembly includes an axle, a hub coupled to the axle, a rotor coupled to the hub, a surface of the axle assembly inboard of the hub, and an adapter. The adapter is coupled to the rotor or the hub. The adapter has an encoder ring portion positioned at a first distance from the surface of the axle assembly, wherein the first distance is substantially equal to a second distance from a corresponding surface of a single wheel axle assembly to an encoder ring portion of the single wheel axle assembly without the adapter.

19 Claims, 6 Drawing Sheets

DUAL WHEEL AXLE ASSEMBLY

FIELD

The present disclosure relates to positioning an encoder ring on a dual wheel axle assembly.

BACKGROUND

Vehicles, such as trucks, may be configured to have either a single wheel axle or a dual wheel axle. A single wheel axle assembly has a single wheel hub on each side of the axle that accommodates a single wheel. A dual wheel axle assembly has a dual wheel hub on each side of the axle that accommodates a pair of wheels. To accommodate a pair of wheels, the dual wheel hub is larger than the single wheel hub. Due to different configurations of single wheel axle assemblies and dual wheel axle assemblies, often similar components have different configurations for the assemblies, such as speed sensing components. This increases the cost associated with manufacturing both the single wheel and the dual wheel axle assemblies.

SUMMARY

A dual wheel axle assembly is provided according to a principle of this disclosure. The dual wheel axle assembly includes an axle, a hub coupled to the axle, a rotor coupled to the hub, a surface of the axle assembly inboard of the hub, and an adapter. The adapter is coupled to the rotor or the hub. The adapter has an encoder ring portion positioned at a first distance from the surface of the axle assembly, wherein the first distance is substantially equal to a second distance from a corresponding surface of a single wheel axle assembly to an encoder ring portion of the single wheel axle assembly without the adapter.

In accordance with another principle of this disclosure, the dual wheel axle assembly further includes a sensor where the sensor is interchangeable between the dual wheel axle assembly and the single wheel axle assembly.

Further areas of applicability of the present disclosure will become apparent from the detailed description, drawings and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
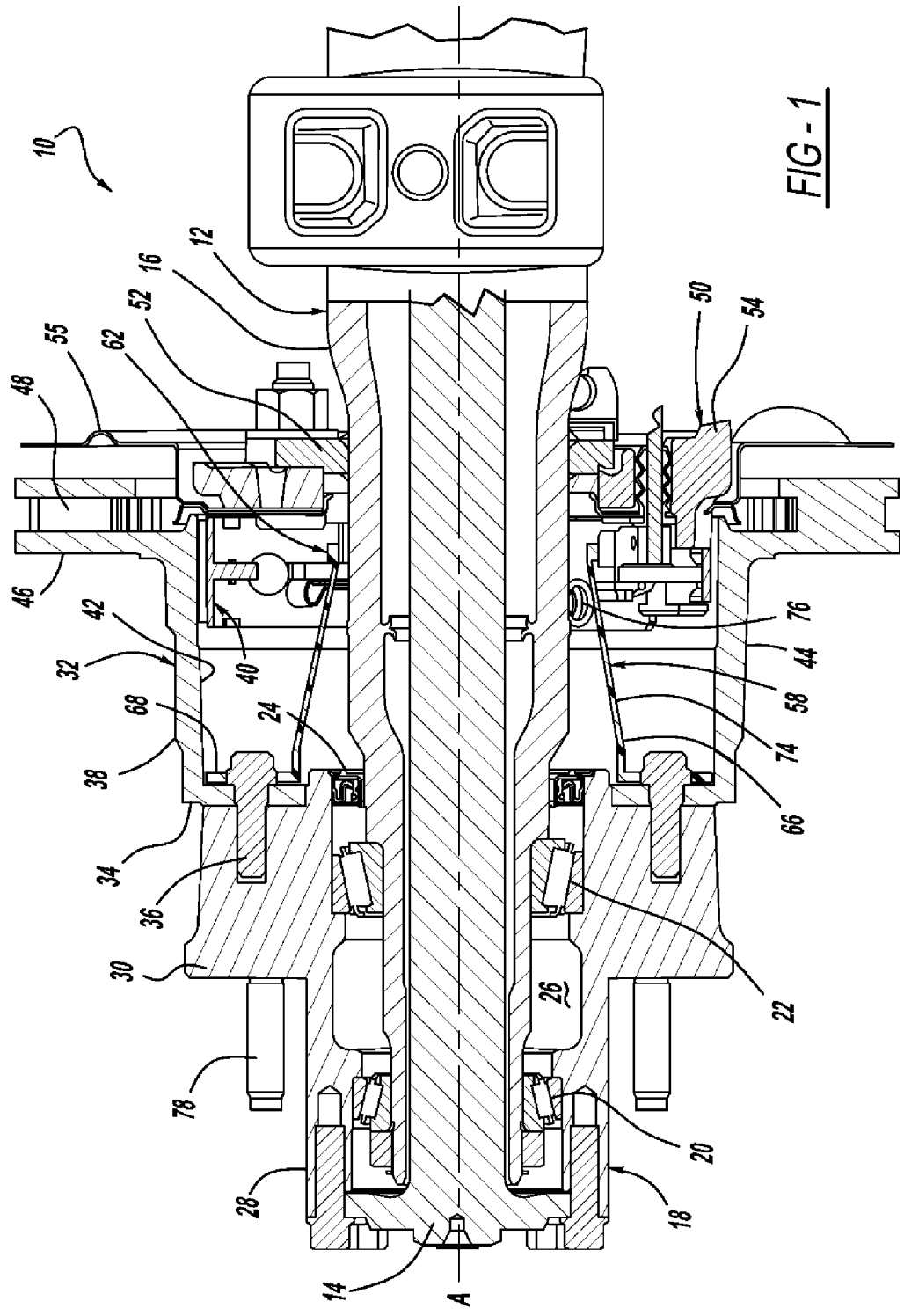
FIG. 1 is a cross-sectional view of a dual wheel axle assembly according to a principle of the present disclosure.

The present disclosure is directed to positioning an encoder ring or tone wheel on a dual wheel axle assembly so common components can be used between dual wheel axle assemblies and single wheel axle assemblies. The dual wheel axle assembly includes an adapter having an encoder ring positioned at a first distance from a surface of the dual wheel axle assembly. The surface is a common, corresponding surface of the dual and single wheel axle assemblies. The single wheel axle assembly includes an encoder ring positioned at a second distance from the common surface, wherein the second distance is substantially equal to the first distance of the dual wheel axle assembly. The dual and single wheel axle assemblies further each include a sensor extending from the surface to engage the respective encoder ring. Because the encoder rings of the dual and single axle assemblies are positioned substantially the same distance from the common surface, common sensor assemblies and potentially other common components may be utilized for the dual and single wheel axle assemblies FIG. 1 illustrates a dual wheel axle assembly 10 according to the present disclosure. Dual wheel axle assembly 10 includes an axle 12 including a rotating component 14 and a non-rotating component 16. Fixedly coupled to rotating component 14 of axle assembly 10 is a dual wheel axle hub 18. To facilitate rotation of dual wheel hub 18 around non-rotating component 16, bearings 20 and 22 are disposed between hub 18 and non-rotating component 16 of axle assembly 10. A sealing device 24 is also provided between hub 18 and non-rotating component 16 of axle 12. Sealing device 24 ensures that lubricant does not leak from a space 26 where bearings 20 and 22 are located.

Dual wheel hub 18 includes an axial portion 28 that extends along an axis A of axle 12, and a radial portion 30 that extends radially outward relative to axis A of axle 12. Fixedly coupled to radial portion 30 is a rotor 32. Rotor 32 includes a first radial portion 34 that extends along axis A of axle 12. First radial portion 34 is fixedly coupled to radial portion 30 of hub 18 by bolts 36. Extending axially from first radial portion 34 is a drum portion 38 of rotor 32. Drum portion 38 of rotor 32 is engaged by parking brake assembly 40. More specifically, an inner circumferential surface 42 of drum portion 38 is engaged by brake assembly 40. An outer circumferential surface 44 of drum portion 38 supports a wheel (not shown). Extending radially outward from drum portion 38 is a second radial portion 46. Second radial portion 46 includes a plurality of vents 48 that assist in cooling rotor 32 during operation thereof.

Fixed to non-rotational component 16 of axle 12 at a portion of axle 12 proximate second radial portion 46 of rotor 32 is an adapter assembly 50. Adapter assembly 50 includes a coupling or axle flange 52 and a park brake adapter 54 fixed to axle flange 52. Adapter assembly 50 also includes a splash plate 55. Axle flange 52 fixes adapter assembly 50 to non-rotating component 16 of axle 12. Disposed through adapter assembly 50 is a sensor for operation with an encoder ring. The sensor is not shown in FIG. 1 or 2, but sensor 56 is shown in both single wheel and double wheel axle configurations of FIG. 3.

In an exemplary embodiment as illustrated in FIG. 1, an adapter 58 positions an encoder ring 62 proximate the sensor. The sensor is configured for detecting a rotational characteristic of encoder ring 62 as it rotates with hub 18 and rotor 32. By detecting rotation of encoder ring 62, a rotational velocity of a road wheel (not shown) may be calculated, for example, and instructions based thereon may be transmitted to various systems within the vehicle including, without limitation, to an electronic stability control system, an anti-lock braking system, and a traction control system.

Figure 5:
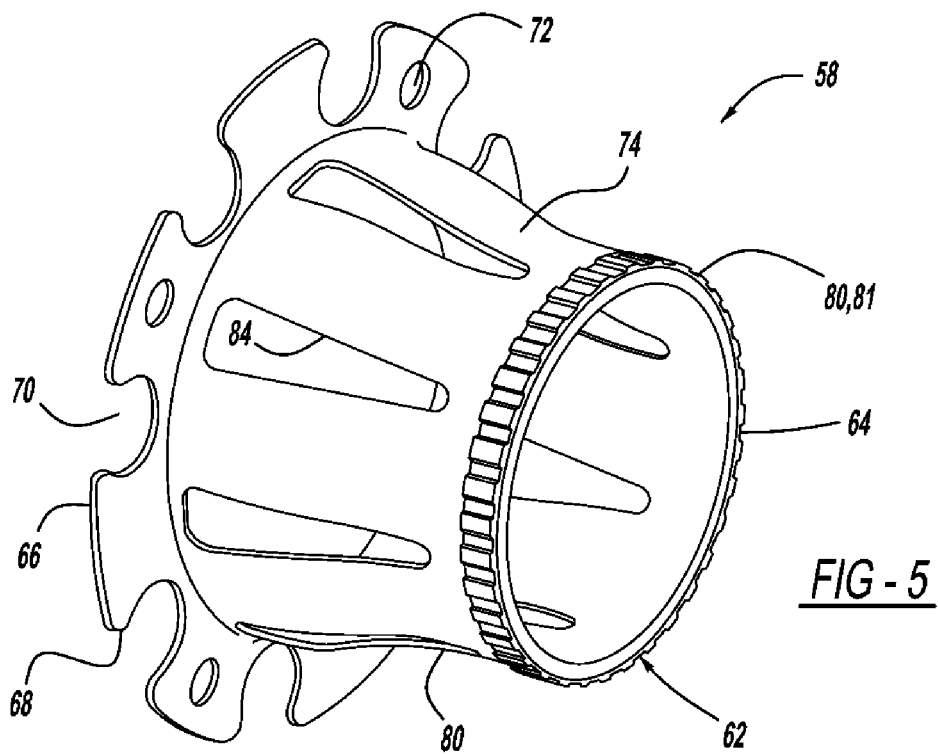
FIG. 5 is a perspective view of an adapter having an encoder ring according to a principle of the present disclosure.

Adapter 58 may be fixed to first radial portion 34 of rotor 32. Alternatively, adapter ring 58 may be fixed to radial portion 30 of dual-wheel hub 18. Adapter 58 is an annular member having encoder ring 62 at an end 64 of the adapter. Referring to FIG. 5, here in an exemplary embodiment, end 66 of the adapter opposite that of encoder ring 62 includes a radially extending flange 68 including a plurality of cutouts 70 that provide clearance for bolts 36. Flange 68 further includes a plurality of apertures 72 for fixing adapter 58 to either hub 18 or rotor 32 via bolts, screws, or the like.

Disposed between encoder ring 62 and annular flange 68 is an extension portion 74. Extension portion 74 extends from flange 68 toward end 64 relative to axis A of axle 12. As extension portion 74 extends axially toward tone ring 62, extension portion 74 gradually tapers radially toward axis A of axle 12. Extension portion 74 gradually tapers radially toward axis A of axle 12 such that the encoder ring 62 may rotate along with hub 18 and rotor 32 without interference by brake assembly 40. That is, extension portion 74 gradually tapers radially toward axis A to avoid components such as springs 76 of park brake assembly 40. Here, end 64 of encoder ring 58 including encoder ring 62 is spaced from non-rotational component 16 of axle 12.

Figure 2:
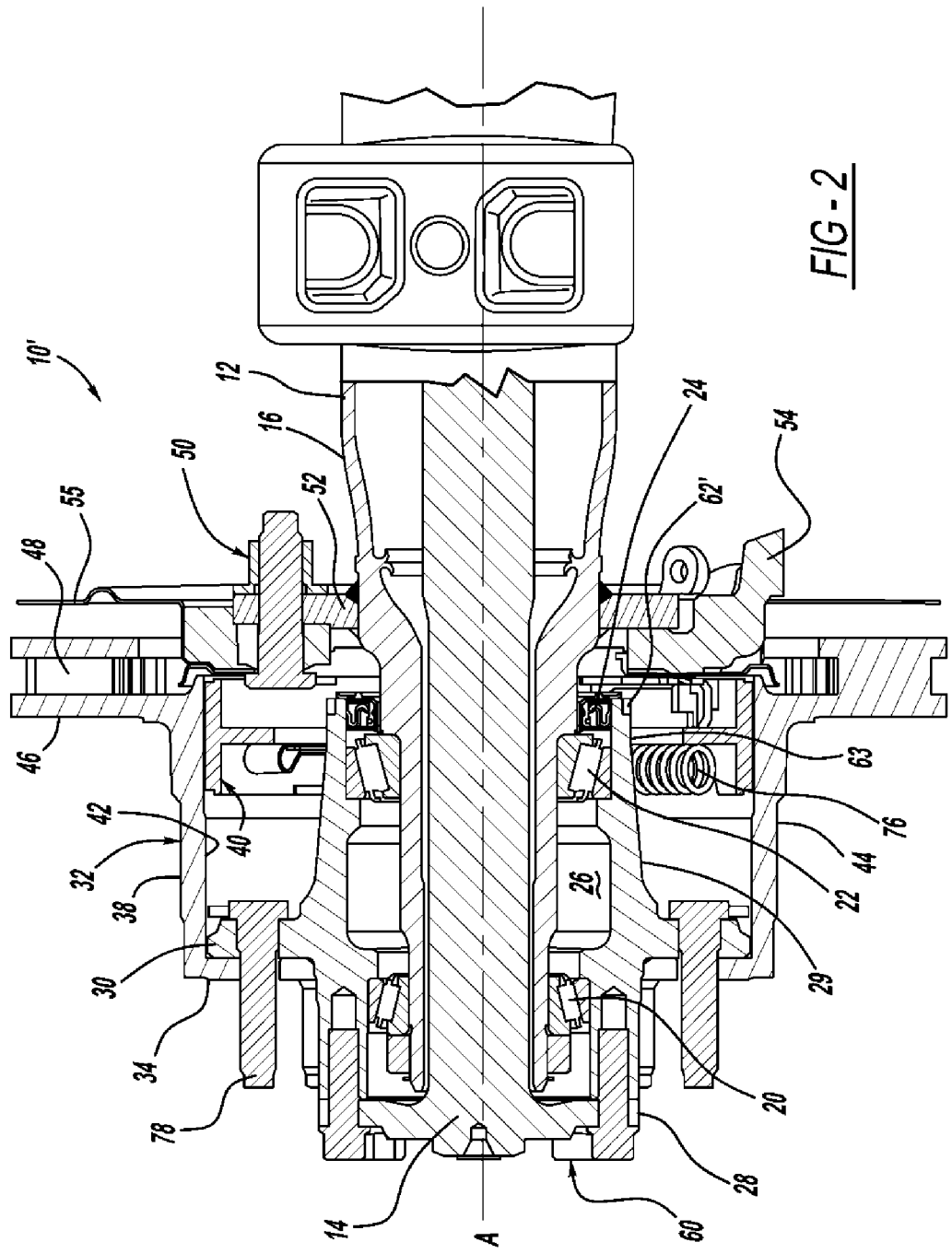
FIG. 2 is a cross-sectional view of a single wheel axle assembly.

FIG. 2 illustrates a single wheel axle assembly 10', including single wheel hub 60. Similar to dual wheel hub 18, single wheel hub 60 includes axial portion 28 and radial portion 30. Single wheel hub 60 also includes an axial leg 29 that extends inboard from radial portion 30 relative to axial portion 28. Bolt 78 that is used to secure a road wheel (not shown) to hub 60, similar to bolt 78 of FIG. 1. An encoder ring 62' of single wheel hub 60 is mounted at an end 63 of axial leg 29, in contrast to encoder ring 62 of dual wheel hub 18 that is disposed on adapter 58. The encoder ring is configured and positioned to allow axle assemblies outfitted with either dual wheel hub 18 or single wheel hub 60 to use common components, for instance non-limiting examples like rotor 32 and a sensor 56 for each axle assembly. This, in turn, reduces manufacturing costs associated with producing vehicles that use either single wheel hub 60 or dual wheel hub 18 in that different designs for components such as the rotor and sensor are not required. It should also be understood that encoder ring 62 is spaced from the sensor at the substantially same position relative to a common surface of the dual wheel hub 18 and the single wheel hub 60 (better shown in FIG. 3).

Figure 3:
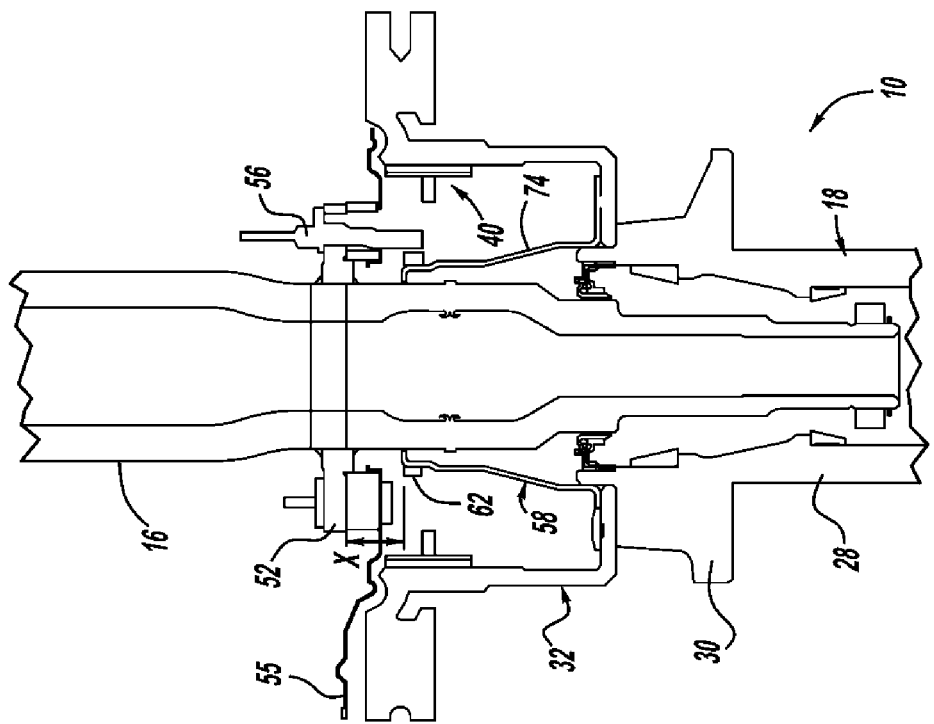
FIG. 3 illustrates side-by-side partial cross-sectional views of a dual wheel axle assembly and a single wheel axle assembly according to a principle of the present disclosure.
Figure 3:
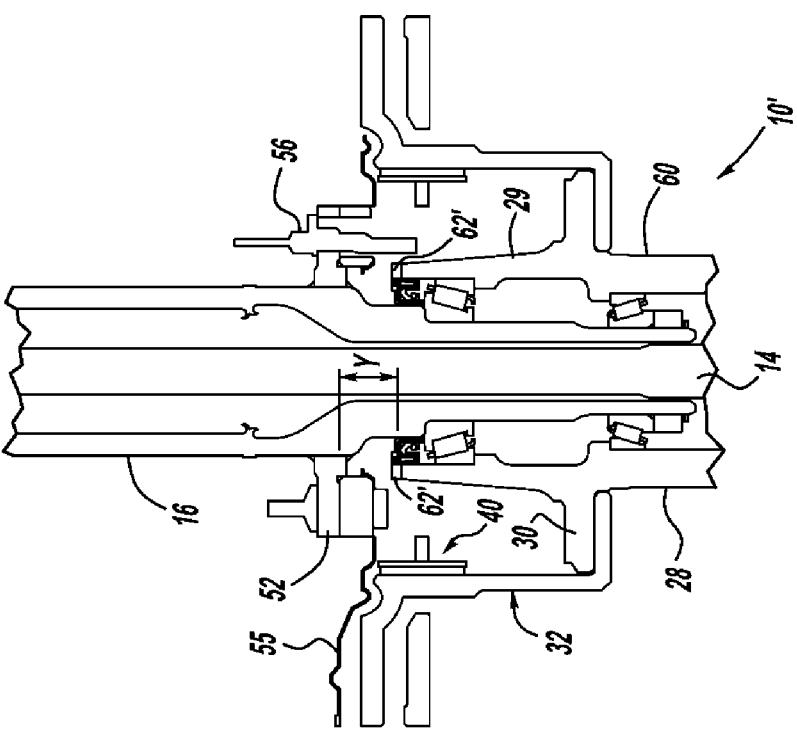

In an exemplary embodiment, FIG. 3 illustrates the positional relationship between encoder rings 62 and 62' and sensor 56 in both the dual wheel axle assembly 10 and single wheel axle assembly 10', respectively. As illustrated in FIGS. 2 and 3, encoder ring 62' is mounted to axial leg 29 of single wheel hub 60. In contrast, as illustrated in FIGS. 1 and 3, encoder ring 62 is mounted to adapter 58 of dual wheel hub 18. Adapter 58 locates encoder ring 62 a first distance X from a surface (e.g., here, a surface of stationary axle flange 52, inboard of the hub 60) that is a common surface in both dual and single wheel axle assemblies 10 and 10'. In some alternative embodiments and depending on the commonality of parts and the configurations of the single and dual wheel assemblies, the common surface could be a surface of the park brake adapter 54 or the splash plate 55.

Single wheel axle assembly 10' includes encoder ring 62' positioned at a second distance Y from the common surface (e.g., axle flange 52, park brake adapter 54, or splash plate 55), wherein second distance Y is substantially equal to first distance X of the dual wheel axle assembly 10. Sensor 56 extending from the common surface is correspondingly positioned in each assembly 10 and 10' relative to encoder rings 62 and 62', respectively. Because the encoder rings of the dual and single wheel axle assemblies 10 and 10' are positioned substantially the same distance from the common surface a common sensor may be utilized for the dual and single wheel axle assemblies 10 and 10'.

Figure 4:
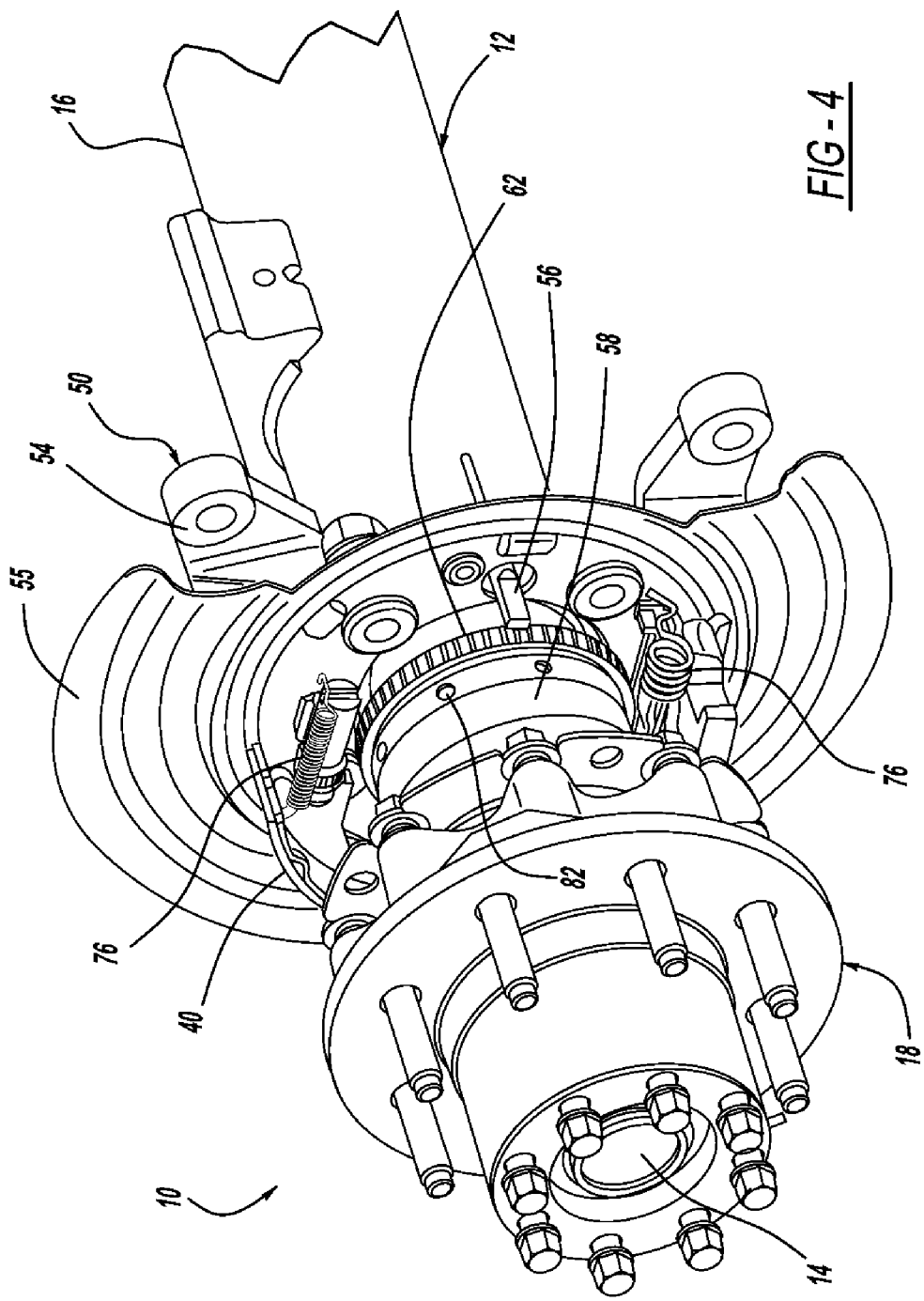
FIG. 4 is a perspective view of the dual wheel axle assembly according to the present disclosure, with various components of the axle assembly removed to illustrate spatial relationships between an encoder ring and a sensor.

FIG. 4 illustrates the spatial relationship between encoder ring 62 and sensor 56 in dual wheel axle assembly 10. Dual wheel axle assembly 10 has some components removed, such as rotor 32. Encoder ring 62 is spaced from sensor 56 such that as the encoder ring rotates with dual-wheel hub 18, sensor 56 may detect certain features, e.g. raised areas or teeth 80 of encoder ring 62 and/or adapter 58. Adapter 58 is dimensioned and positioned to provide clearance between encoder ring 62 and sensor 56. In an exemplary embodiment, sensor 56 may be an optical sensor and detect teeth 80. In certain exemplary embodiments, teeth 80 may include a magnetic material for use with a magnetic sensor.

In one exemplary embodiment and referring to FIG. 5, adapter 58 having encoder ring 62 positioned at end 64 of the adapter is shown. As described above, teeth 80 of encoder ring 62 may be formed from a plurality of alternating magnetic poles 81. Magnetic poles 81 may include a magnetic material such as a ferromagnetic material that is disposed around end portion 64 of adapter 58. Magnetic poles 81 may be formed from magnetized materials such as cobalt, nickel, rare-earth elements, or alloys thereof. Teeth 80 and other portions of the encoder ring may be integral with adapter 58 and formed from the same material as adapter 58. Materials that may be used to form the adapter and the encoder ring include steel, aluminum, titanium, or other metal materials. Further, the adapter and portions of the encoder ring may be formed from a thermoplastic material.

Extension portion 74 of the adapter may have through holes 82 (as shown in FIG. 4) proximate encoder ring 62 that allow drainage of water, debris, and the like therefrom. In another embodiment, as illustrated in FIG. 5, extension portion 74 may include a plurality of holes 84 that, in addition to allowing drainage of water and debris from adapter 58, the holes reduce the amount of material associated with manufacture of adapter 58, which reduces material costs. Additionally, through holes 82 and 84 may assist in cooling or venting of axle assembly 10 during rotation of encoder ring 62 and hub 18. Through holes 82 and 84 may be any size or shape.

Figure 6:
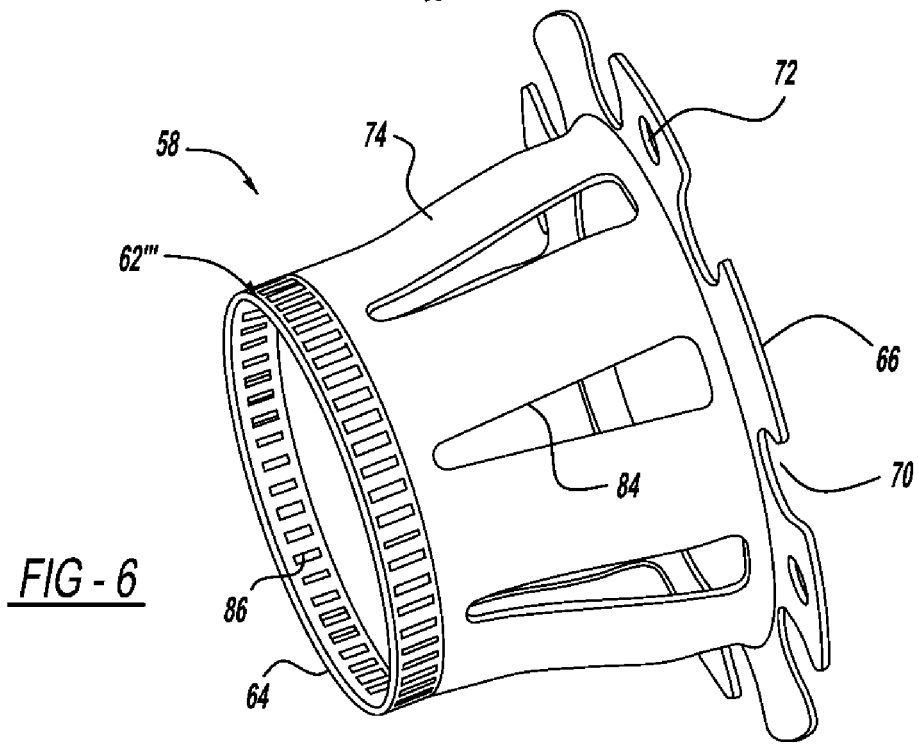
FIG. 6 is a perspective view of another adapter having an encoder ring according to another principle of the present disclosure.

In another embodiment and referring to FIG. 6, adapter 58 includes an encoder ring 62''' defined by a plurality of spaced cut-outs, non-metal areas, or apertures 86. Encoder ring 62''' may be integral with adapter 58. The adapter and encoder ring of FIG. 6 may be formed from the material options given above for the adapter and encoder ring of FIG. 5. In certain embodiments, sensor 56 is an optical sensor utilizing apertures 86.

Figure 7:
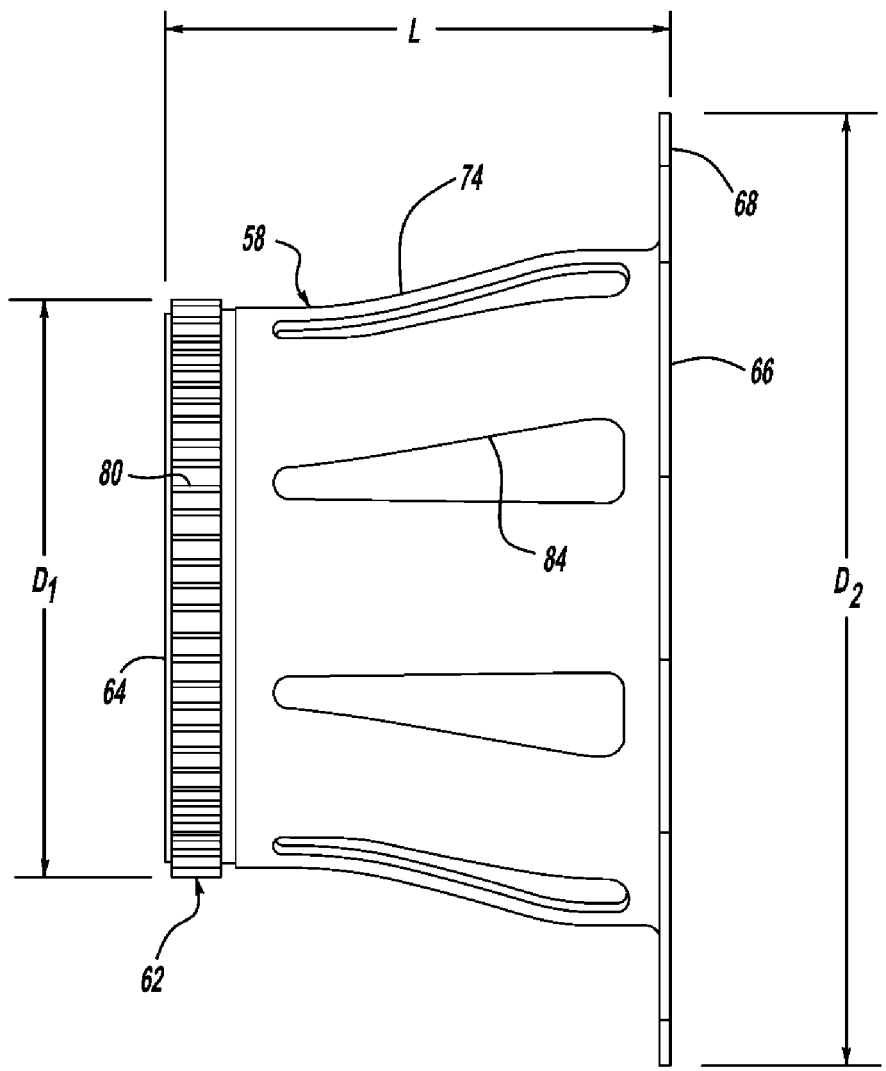
FIG. 7 is a side view of the adapter and encoder ring illustrated in FIG. 5.

Adapter 58 is configured so distances X and Y are substantially the same for both the dual wheel axle assembly and single wheel axle assembly. In this regard, referring to FIG. 7, a length L, a diameter D1, and a diameter D2 of adapter 58 may be variable to account for differences between dual wheel hub 18 and single wheel hub 60. Adapter 58 allows the same sensor and other components to be used for both the single wheel axle assembly 10' and dual wheel axle assembly 10.

As stated above, sensor 56 may be selected based on either detection of, for example, the magnetic poles or raised areas 81, or the voids created by detection apertures 86. More specifically, sensor 56 may be operable to detect the alternating magnetic fields generated by alternating magnetic poles 81, or may be operable as an optical sensor that detects the raised areas 81 or the voids created by detection apertures 86. Regardless, encoder ring 62 in operation with sensor 56 enables detection of a rotational velocity of encoder ring 62 as it rotates with hub 18 or 60.

What is claimed is:

1. A dual wheel axle assembly comprising:
   an axle;
   a hub coupled to the axle;
   a rotor coupled to the hub;
   a surface of the axle assembly located axially inboard of the hub; and
   an adapter including a mounting portion that couples the adapter to the hub or the rotor and an encoder rig portion that is axially spaced apart from the mounting portion, the encoder ring portion being positioned at a first distance from the surface, wherein the first distance is substantially equal to a second distance from a corresponding surface of a single wheel axle assembly to an encoder ring portion of the single wheel axle assembly without the adapter.

2. The dual wheel axle assembly of claim 1, wherein the encoder ring portion includes a plurality of apertures.

3. The dual wheel axle assembly of claim 1, wherein the encoder ring portion includes a plurality of raised areas.

4. The dual wheel axle assembly of claim 1, wherein the encoder ring portion includes a plurality of spaced magnetic areas.

5. The dual wheel axle assembly of claim 1, wherein the encoder ring portion includes a plurality of spaced non-metal areas.

6. The dual wheel axle assembly of claim 1, wherein the adapter includes a plurality of apertures.

7. The dual wheel axle assembly of claim 1, further comprising a sensor extending from the surface toward the encoder ring portion.

8. The dual wheel axle assembly of claim 7, wherein the sensor is an optical sensor.

9. The dual wheel axle assembly of claim 7, wherein the sensor can be interchangeable between the dual wheel axle and single wheel axle assemblies.

10. The dual wheel axle assembly of claim 1, wherein the surface is a surface of a park brake adapter or an axle flange.

11. The axle assembly of claim 1, wherein the encoder ring portion is an integral portion of the adapter.

12. An axle assembly comprising:
    an axle having a rotating component and a non-rotating component;
    a hub fixed to the rotating component axle;
    a rotor fixed to the hub;
    an adapter attached to the hub or the rotor, the adapter having a first end mounted to the hub or the rotor and a second end opposite the first end, the second end having an encoder ring, the first end and the second end connected by an extension portion that extends axially relative to an axis of the axle and away from the hub in a first direction; and
    a sensor mounted to a surface of the non-rotating component of the axle, located axially inboard from the hub, the sensor extends axially back toward the encoder ring in a second direction opposite the first direction for detecting a rotational characteristic of the encoder ring.

13. The axle assembly of claim 12, wherein the hub is a dual wheel hub and the encoder ring being positioned at a first distance from the surface, the distance being substantially equal to a second distance from a corresponding surface of a single wheel axle assembly to an encoder ring of the single wheel axle assembly.

14. The axle assembly of claim 12, wherein the encoder ring includes a plurality of alternating magnetic poles.

15. The axle assembly of claim 14, wherein the sensor is a magnetic sensor.

16. The axle assembly of claim 12, wherein the encoder ring includes a plurality of apertures.

17. The axle assembly of claim 16, wherein the sensor is an optical sensor.

18. The axle assembly of claim 12, wherein the sensor can be interchangeable between a dual wheel axle assembly and a single wheel axle assembly.

19. The axle assembly of claim 12, wherein said hub includes a radially extending portion, and said encoder ring portion is mounted to the radially extending portion.

* * * * *